(12) United States Patent
Decker et al.

(10) Patent No.: US 12,434,090 B2
(45) Date of Patent: Oct. 7, 2025

(54) PULLEY SYSTEM FOR A WEIGHTLIFTING APPARATUS

(71) Applicant: Bullet Pulley LLC, Jacksonville, FL (US)

(72) Inventors: Andrew William Decker, Jacksonville, FL (US); Steven Christopher Ramos, Saint Johns, FL (US); Sri Chand, Pune (IN)

(73) Assignee: BULLET PULLEY LLC, Jacksonville, FL (US)

( * ) Notice: Subject to any disclaimer, the term of this patent is extended or adjusted under 35 U.S.C. 154(b) by 0 days.

(21) Appl. No.: 18/965,309

(22) Filed: Dec. 2, 2024

(65) Prior Publication Data

US 2025/0090895 A1    Mar. 20, 2025

Related U.S. Application Data

(63) Continuation of application No. 18/743,746, filed on Jun. 14, 2024.

(60) Provisional application No. 63/508,667, filed on Jun. 16, 2023.

(51) Int. Cl.
| | |
|---|---|
| *A63B 21/00* | (2006.01) |
| *A63B 21/062* | (2006.01) |
| *B66D 3/04* | (2006.01) |
| *F16B 39/36* | (2006.01) |

(52) U.S. Cl.
CPC ........ *A63B 21/156* (2013.01); *A63B 21/0626* (2015.10); *B66D 3/04* (2013.01); *F16B 39/36* (2013.01)

(58) Field of Classification Search
CPC ..... A63B 21/154; A63B 21/156; F16B 39/36; F16B 37/00; B66D 3/04–08
See application file for complete search history.

(56) References Cited

U.S. PATENT DOCUMENTS

| | | | | |
|---|---|---|---|---|
| 931,699 | A * | 8/1909 | Medart | A63B 21/062 |
| | | | | 482/102 |
| 3,773,295 | A * | 11/1973 | Holmes | B66D 3/04 |
| | | | | 254/409 |
| 4,721,303 | A * | 1/1988 | Fitzpatrick | A63B 21/0628 |
| | | | | 482/99 |
| 5,951,444 | A * | 9/1999 | Webber | A63B 21/154 |
| | | | | 482/99 |
| 10,328,510 | B2 * | 6/2019 | Yamaguchi | B65H 49/36 |
| 2011/0183817 | A1 * | 7/2011 | Giannelli | A63B 21/156 |
| | | | | 482/94 |

(Continued)

FOREIGN PATENT DOCUMENTS

CN    110797794 A *   2/2020   ............... H02G 1/02

*Primary Examiner* — Anna M Momper
*Assistant Examiner* — Nathaniel L Adams
(74) *Attorney, Agent, or Firm* — Jason A. Smith; Shumaker, Loop & Kendrick, LLP

(57) ABSTRACT

A pulley system for a weight lifting apparatus includes a swivel bracket attached to a V brace bracket on one side and a pulley bracket on the other side along with a V brace attached to the V brace bracket, and a pulley attached to the pulley bracket. This arrangement of the V brace, the V brace bracket, the swivel bracket, the pulley, and the pulley bracket along with a plurality of first washers collectively form a main assembly. The main assembly is fastened to a beam on the weight lifting apparatus using a conical tapered nut.

15 Claims, 31 Drawing Sheets

(56) References Cited

U.S. PATENT DOCUMENTS

| | | | |
|---|---|---|---|
| 2018/0200563 A1* | 7/2018 | Hansen | F16B 21/09 |
| 2020/0222745 A1* | 7/2020 | Leipheimer | A63B 21/154 |
| 2020/0283275 A1* | 9/2020 | Gurule | B66D 3/08 |
| 2021/0299510 A1* | 9/2021 | Gresham | A63B 21/156 |

* cited by examiner

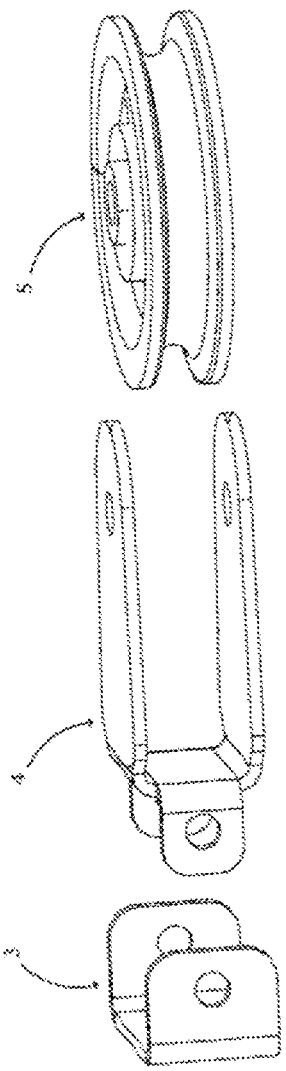
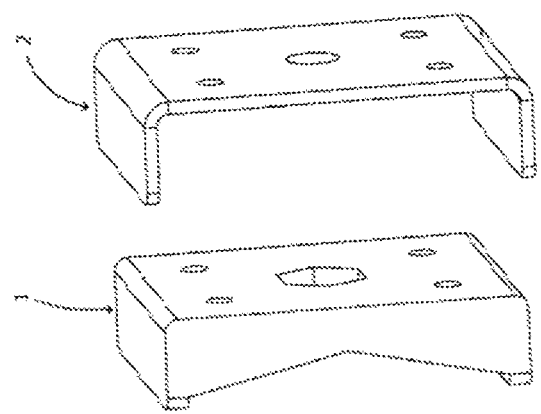
FIG. 1

PULLEY SYSTEM FOR A WEIGHTLIFTING APPARATUS

PRIORITY INFORMATION

The present application is a patent of addition claiming priority from the provisional application No. 63/508,667 filed on Jun. 16, 2023.

TECHNICAL FIELD

This invention relates to the field of weightlifting and gym apparatus and more particularly related to a pulley system used for weightlifting apparatus.

BACKGROUND OF INVENTION

Weightlifting and strength training have become increasingly popular activities for individuals seeking to improve their fitness, build muscle, and enhance overall health. Within the realm of weightlifting, power racks are fundamental pieces of equipment used for various exercises, providing stability and safety during lifting routines.

Traditionally, weight lifting apparatus and power racks have been designed with fixed configurations, limiting their adaptability and versatility. Existing equipment and devices often lack compatibility with different brands or sizes of equipment, constraining users to specific options based on their existing setup.

Recognizing the limitations of existing designs, there is a growing need for innovative solutions that offer greater flexibility and functionality in weight lifting equipment. There is a demand for a versatile accessory compatible with a wide range of weight lifting apparatus and power racks.

The increasing demand can be fulfilled by pulleys, along with specialized fasteners and a locking mechanism to enhance the capabilities of existing weight lifting setups. A gym equipment with which the users shall be able to perform a diverse array of exercises targeting different muscle groups, thereby optimizing their workout routines for improved results. Moreover, fitness enthusiasts shall have the flexibility to customize their training regimen according to their specific needs and preferences.

Hence there is a need for a universal pulley system that addresses these challenges by providing users with a flexible and functional accessory compatible with various weight lifting apparatus, thereby enhancing the effectiveness and enjoyment of strength training workouts.

SUMMARY

Before the present system(s) and method(s), are described, it is to be understood that this application is not limited to the particular system(s), and methodologies described, as there can be multiple possible embodiments that are not expressly illustrated in the present disclosures. It is also to be understood that the terminology used in the description describes the implementations or versions or embodiments only and is not intended to limit the scope of the present application. This summary is provided to introduce aspects related to a pulley system and an installation method. This summary is not intended to identify essential features of the claimed subject matter nor is it intended for use in determining or limiting the scope of the claimed subject matter.

The present subject matter herein describes a pulley system that offers a solution to the limitations of existing weight lifting equipment by providing enhanced versatility and compatibility with a wide range of weight lifting apparatus and power racks. The pulley system comprises components such as swivel brackets, V brace, V brace brackets, pulley brackets, pulleys, and specialized fasteners, all designed to facilitate controlled movement during strength training exercises. With features like friction-reducing first washers and a secure locking mechanism, the present subject matter not only improves functionality but also enhances user safety and overall workout experience.

In the present subject matter, the pulley system includes V brace, V brace brackets, swivel brackets, pulley brackets, pulley, conical tapered nut, and friction-reducing first washers along with a secure locking mechanism involving different bolts and corresponding nuts.

In an aspect the V brace, a key feature of the pulley system is designed to stabilize and support the pulley system. The V brace is attached to the V brace bracket using four bolts and corresponding nuts. Alternatively, there may be a plurality of bolts and nuts may provide a locking mechanism. The V brace is a V-shaped trough, made up of a non-marring polymer material to protect the power rack beam from damage during use. The V Brace is tapered in shape making a V shape in such a manner to prevent twisting left or right during tightening of the rear tapered conical nut. The V Brace is designed to facilitate a universal fit for any sized power rack beam up to 3"×3" in dimension.

In another aspect, the V Brace bracket is designed in a particular manner to provide support and stabilization to the V brace. The V brace bracket is constructed from strong and durable metal in a U-shaped configuration to prevent deformation and damage to the V brace. The V bracket securely holds the V brace in position using four bolts and nuts. Additionally, the V bracket holds the swivel bracket in place with a bolt and locking nut mechanism.

In another aspect, the swivel bracket is a pivotal component of the pulley system. The swivel bracket is attached to the V brace bracket using bolt and locking nut on the rear side, to provide versatile and adaptable movements. The swivel bracket is designed in a particular manner to facilitate certain degrees of swiveling movement towards the left and right-hand side, enhancing flexibility in exercise positioning. The U-shaped configuration of the swivel bracket provides structural strength while facilitating controlled rotation.

In another aspect, the pulley system further includes a pulley and the pulley bracket. The pulley bracket is attached to the swivel bracket using a bolt, the corresponding nut, and friction-reducing first washers. This attachment mechanism ensures stable and controlled movement of the pulley bracket. The pulley bracket offers a wide range of motion, swiveling left or right with a range of 180 degrees, allowing for versatile exercise options. The pulley is a nylon wheel with an inner bearing and a grooved rim for threading lifting cables or ropes. However, the pulley can be made up of any prevalent material used in the gym equipment. The pulley is securely attached to the pulley bracket using the bolt and corresponding nut, ensuring stability during operation. The pulley can be easily removed for lifting cable replacements or adjustments, enhancing the system's adaptability.

In yet another aspect, the pulley system includes the conical Tapered Nut that secures the main assembly to a power rack beam. The conical tapered design of the conical tapered nut facilitates universal fitting on power rack beams with holes ranging up to 1.375 inches in diameter. The conical tapered nut features a faux knurling pattern engraved on its surface that provides an enhanced grip along with the appearance of a traditional gym barbell. Hence the knurled surface of the conical tapered nut provides aesthetic appeal and reinforces the association with gym equipment as well.

Additionally, friction-reducing first washers reduce friction during the operational phase. The use of bolt and nut, and friction-reducing first washers made up of nylon, enables stable positioning and controlled movement of the pulley bracket within the swiveling range of the device.

In yet another aspect, a method for attaching one component to another and establishing a connection between all the components may be performed.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The foregoing detailed description of embodiments is better understood when read in conjunction with the appended drawings. To illustrate the present subject matter, an example of a construction of the present subject matter is provided as figures, however, the present subject matter is not limited to the specific pulley system and method for assembling different components together to form a versatile pulley, as disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Embodiments herein are illustrated in the accompanying drawings, throughout which like reference letters indicate corresponding parts in the various figures. The example embodiments herein will be better understood from the following description with reference to the drawings, in which:

FIG. 1 illustrates an exploded perspective view of the components, without assembly hardware, that assemble to form the embodiment of the present invention.

FIG. 2 illustrates an additional exploded perspective view of the components, without assembly hardware, that assemble to form the embodiment of the present invention.

FIG. 3 illustrates a top view of the assembled main assembly and conical tapered nut, in accordance with an embodiment of the present invention.

FIG. 4 illustrates a side view of the assembled main assembly and conical tapered nut, in accordance with an embodiment of the present invention.

FIG. 5 is a perspective view of the assembled main assembly and conical tapered nut, in accordance with an embodiment of the present invention.

FIG. 6 illustrates a top view of the assembled main assembly mounted on a 3"×3" beam of a weight lifting apparatus such as a power rack, in accordance with an embodiment of the present invention.

FIG. 7 illustrates a top view of the assembled main assembly mounted on a 2.5"×2.5" beam of a weight lifting apparatus such as a power rack, in accordance with an embodiment of the present invention.

FIG. 8 illustrates a front perspective view of the pulley mounting bracket, in accordance with an embodiment of the present invention.

FIG. 9 illustrates a rear perspective view of the pulley mounting bracket, in accordance with an embodiment of the present invention.

FIG. 10 illustrates a side view of the pulley mounting bracket, in accordance with an embodiment of the present invention.

FIG. 11 illustrates a top view of the pulley mounting bracket, in accordance with an embodiment of the present invention.

Figure 12:
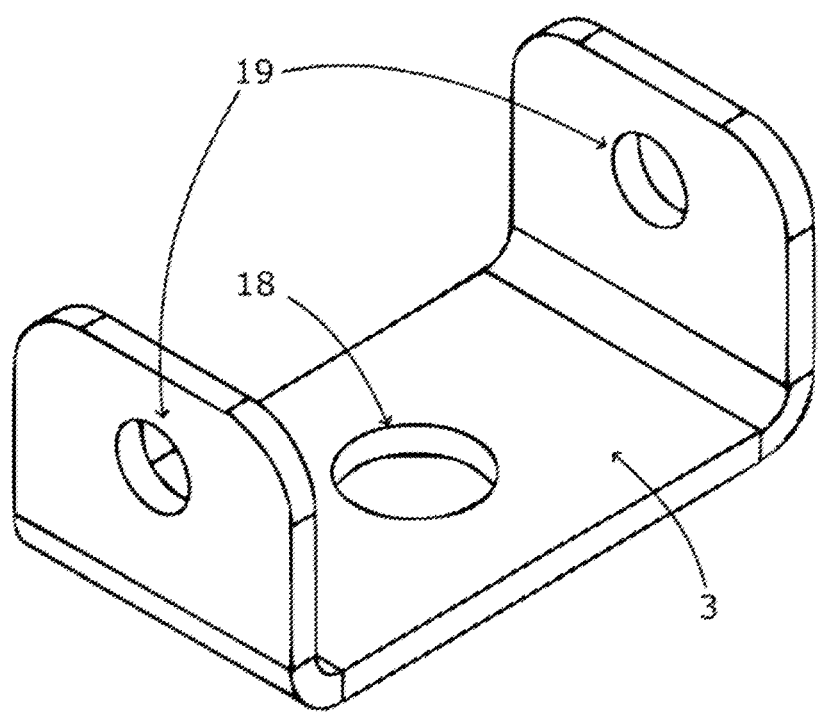

FIG. 12 illustrates a front perspective view of the swivel bracket, in accordance with an embodiment of the present invention.

Figure 13:
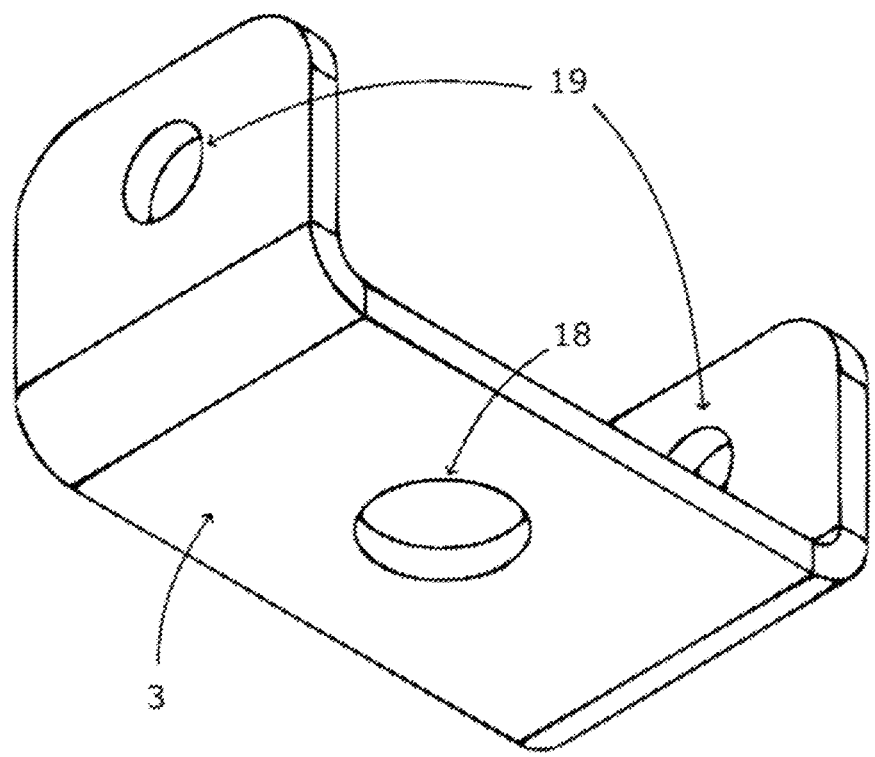

FIG. 13 illustrates a rear perspective view of the swivel bracket, in accordance with an embodiment of the present invention.

Figure 14:
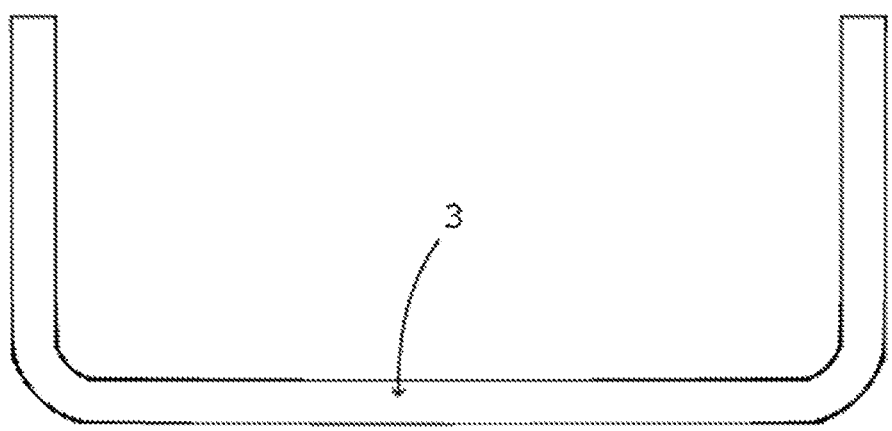

FIG. 14 illustrates a side view of the swivel bracket, in accordance with an embodiment of the present invention.

Figure 15C:
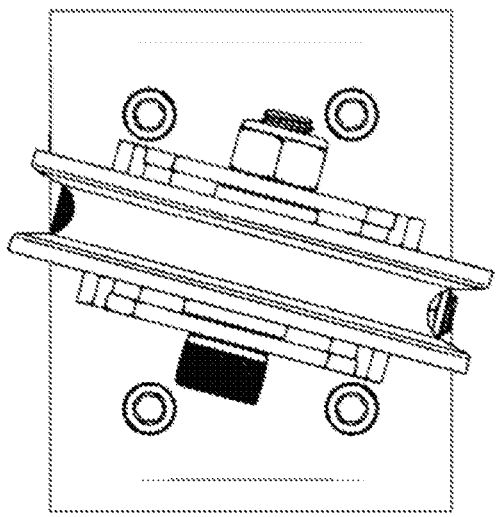
Figure 15B:
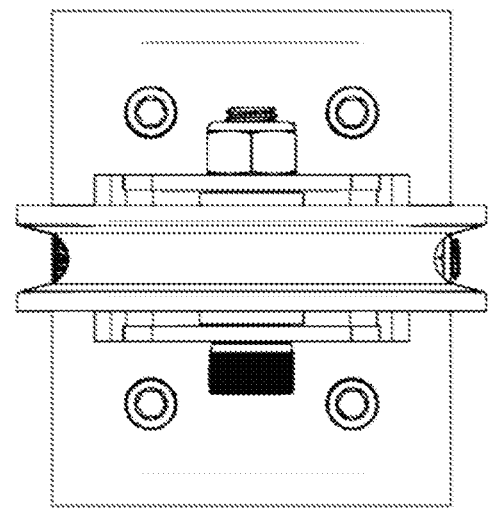
Figure 15A:
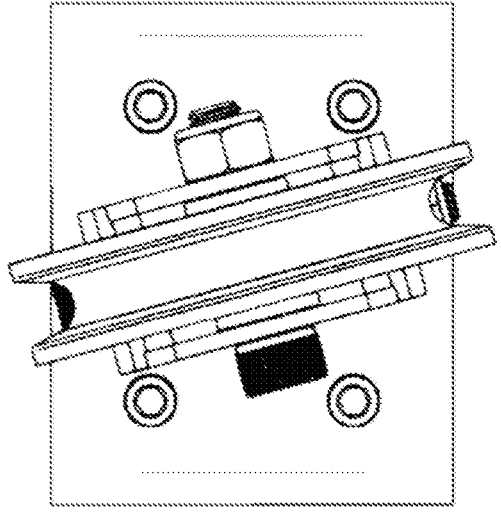

FIG. 15A illustrates a front view of the assembled main assembly wherein the swivel bracket is rotating 15 degrees to the left in accordance with an embodiment of the present invention. FIG. 15B illustrates a front view of the assembled main assembly, in accordance with an embodiment of the present invention. FIG. 15C illustrates a front view of the assembled main assembly wherein the swivel bracket is rotating 15 degrees to the right, in accordance with an embodiment of the present invention.

Figure 16:
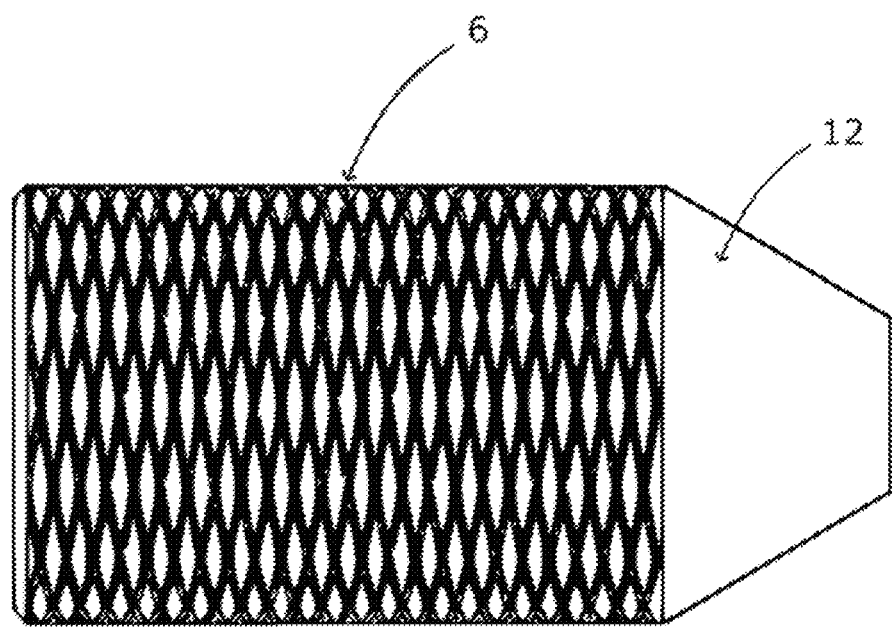

FIG. 16 illustrates a side view of the conical tapered nut, in accordance with an embodiment of the present invention.

Figure 16A:
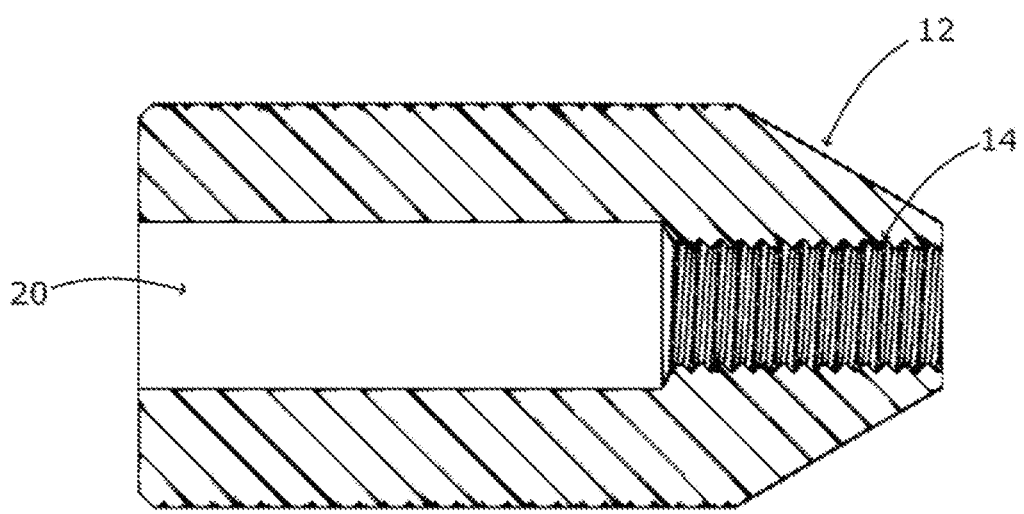

FIG. 16a illustrates a cutaway view of the conical tapered nut, in accordance with an embodiment of the present invention.

Figure 17:
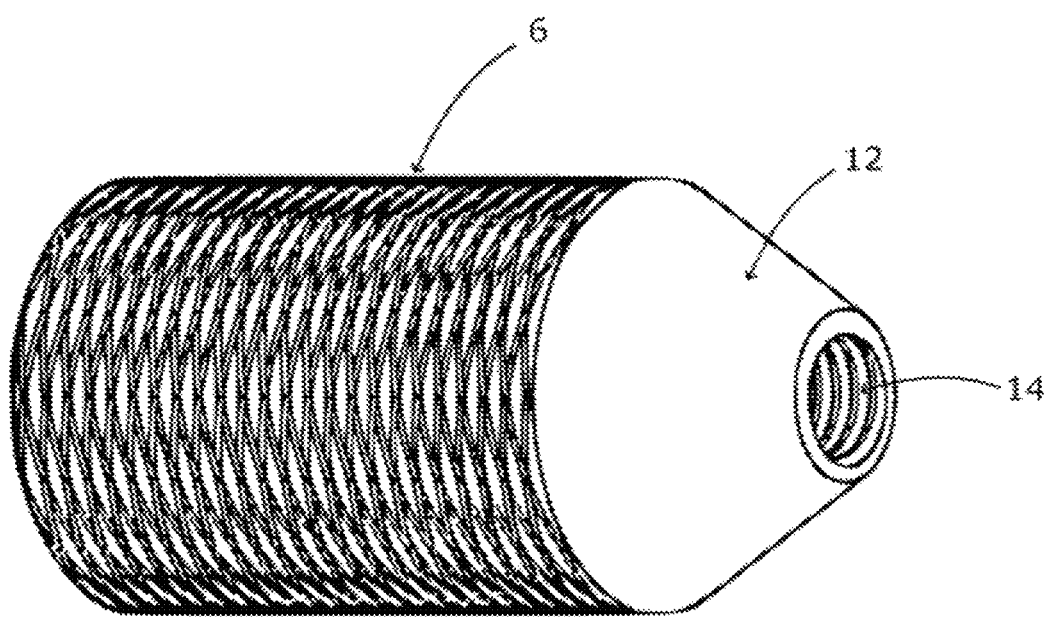

FIG. 17 illustrates a front perspective view of the conical tapered nut, in accordance with an embodiment of the present invention.

Figure 18:
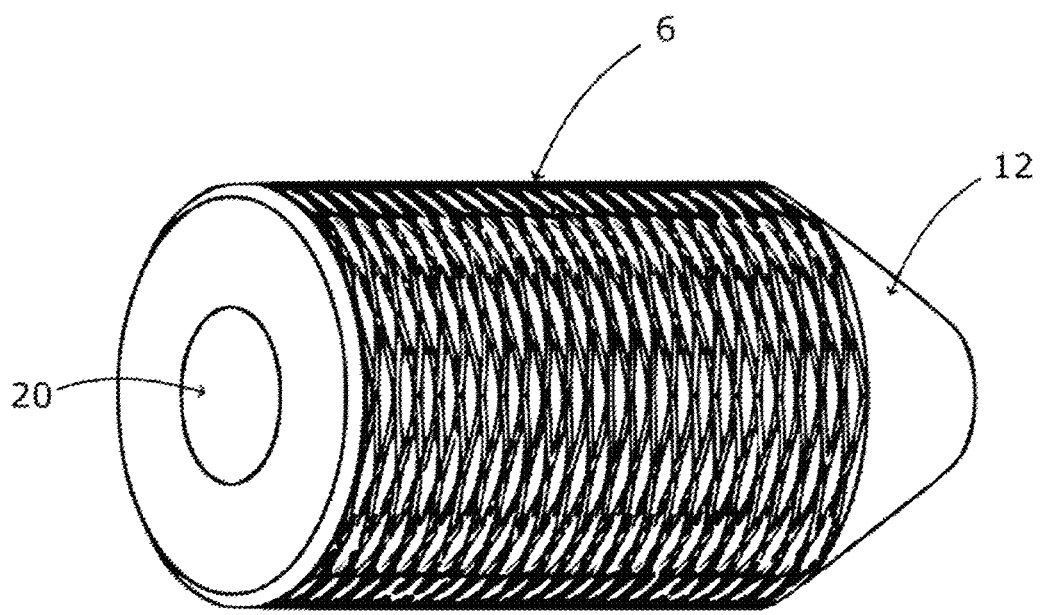

FIG. 18 illustrates a front perspective view of the conical tapered nut, in accordance with an embodiment of the present invention.

Figure 19:
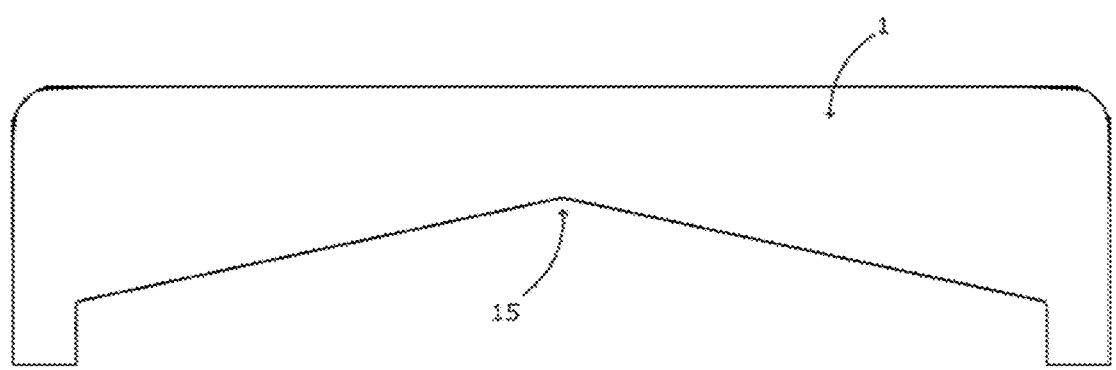

FIG. 19 illustrates the top view of the V brace, in accordance with an embodiment of the present invention.

FIG. 20 illustrates a front perspective view of the V brace, in accordance with an embodiment of the present invention.

Figure 21:
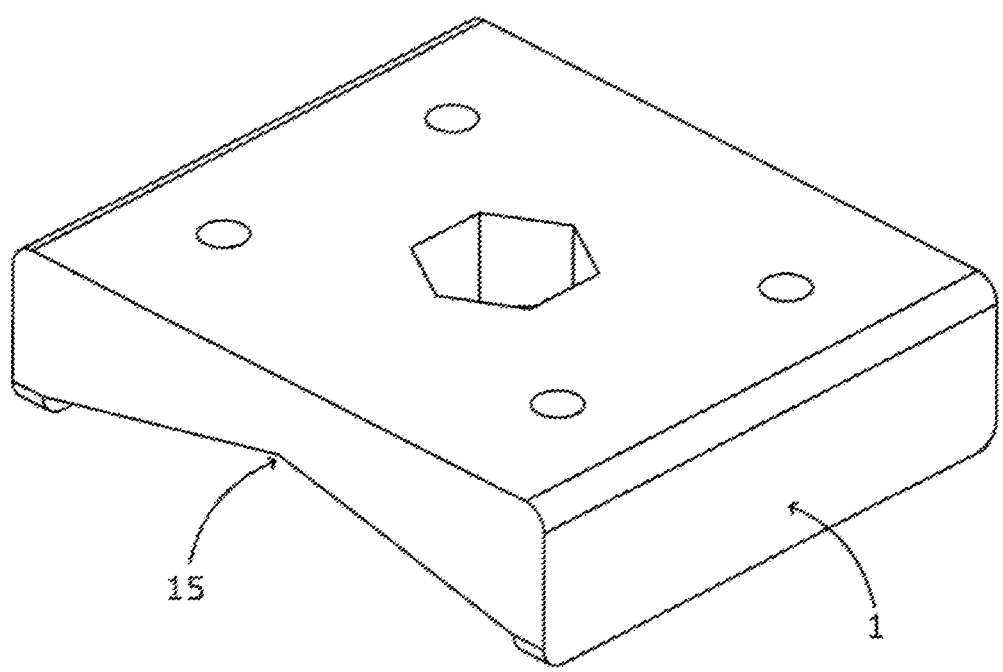

FIG. 21 illustrates a rear perspective view of the V brace, in accordance with an embodiment of the present invention.

Figure 22:
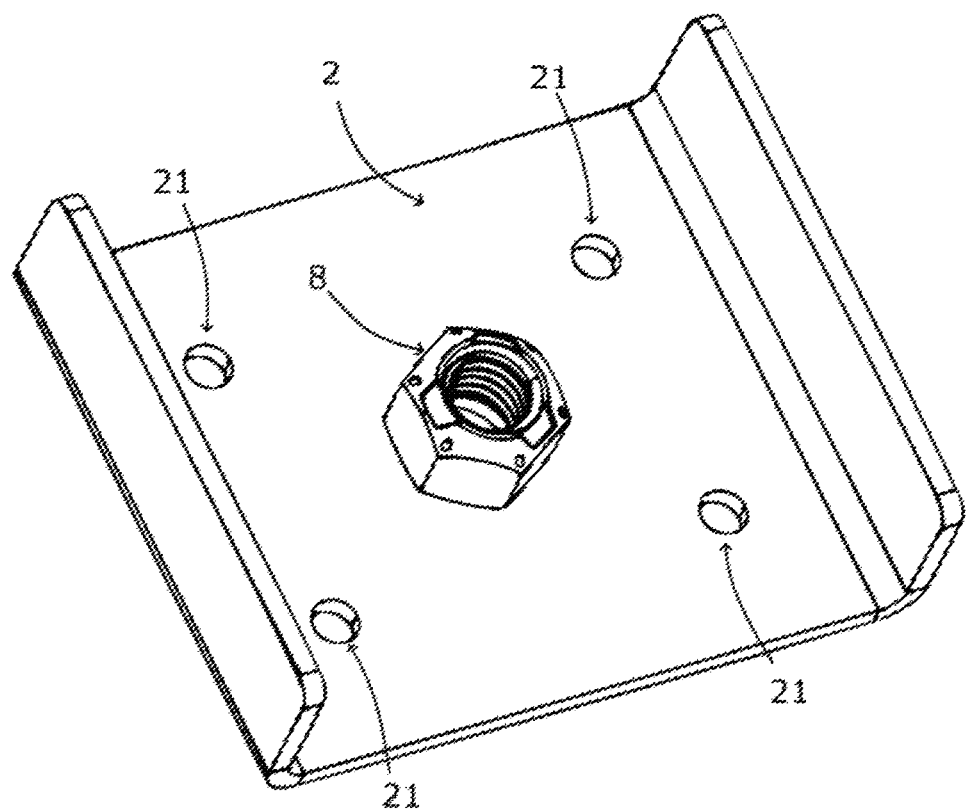

FIG. 22 illustrates a rear perspective view of the V brace bracket, in accordance with an embodiment of the present invention.

Figure 23:
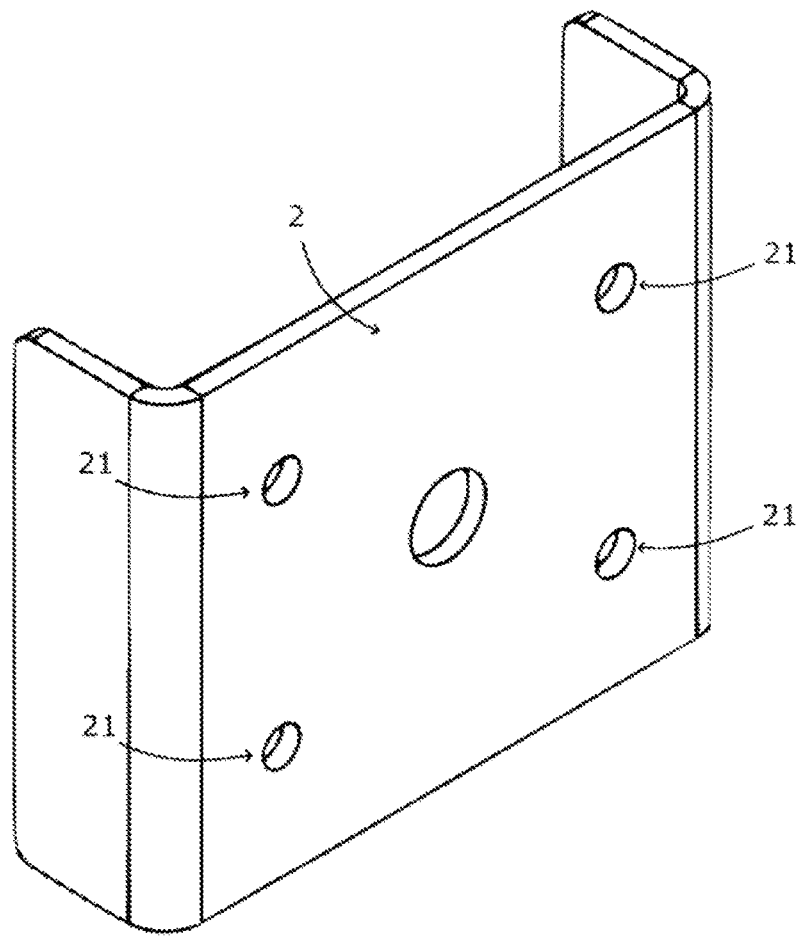

FIG. 23 illustrates a front perspective view of the V brace bracket, in accordance with an embodiment of the present invention.

Figure 24:
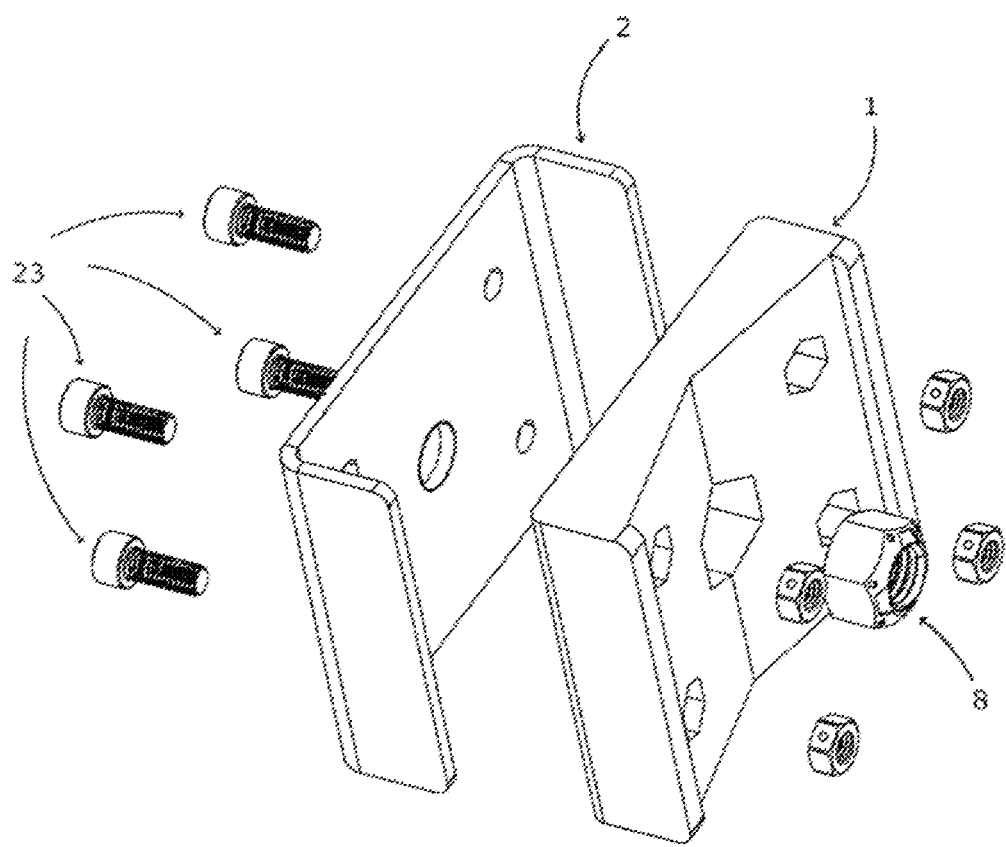

FIG. 24 illustrates an exploded perspective view of the V brace and V brace bracket fitment, shown with assembly hardware, in accordance with an embodiment of the present invention.

Figure 25:
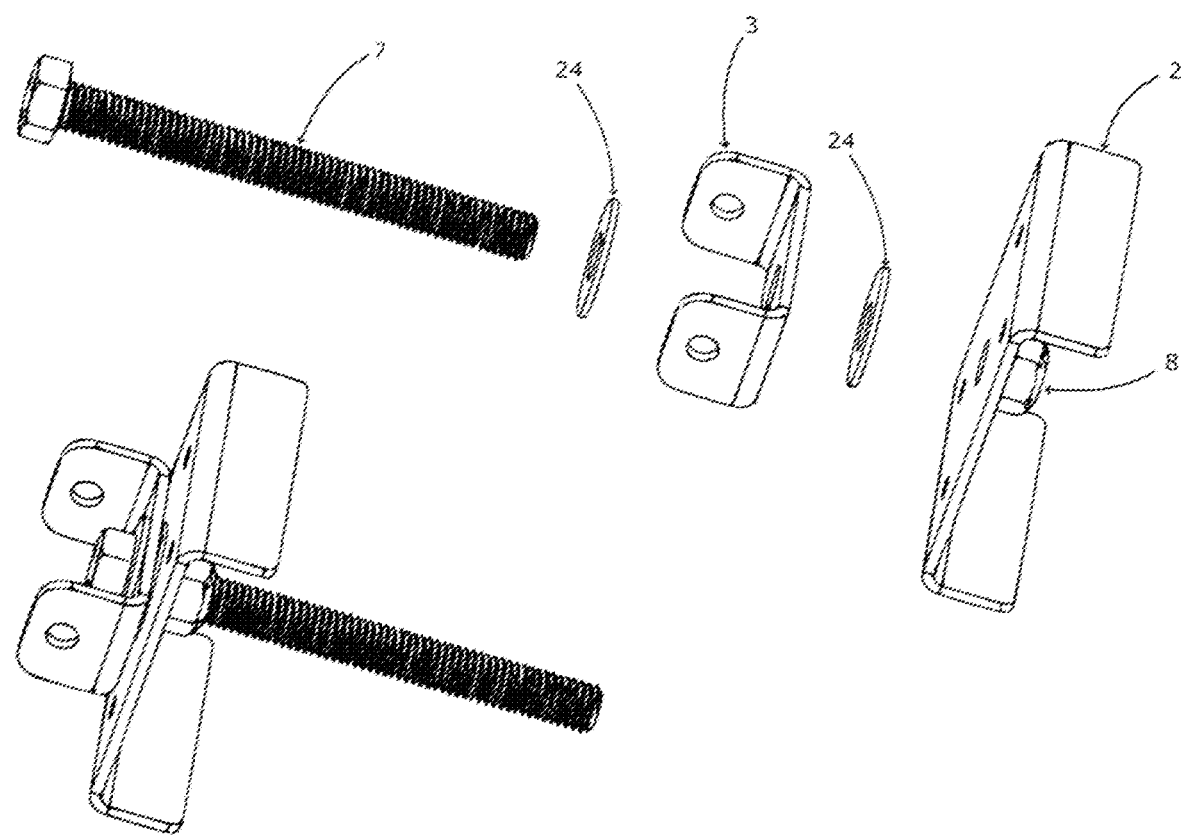

FIG. 25 illustrates an exploded and assembled view of the swivel bracket and V brace bracket, shown with assembly hardware, in accordance with an embodiment of the present invention.

Figure 26:
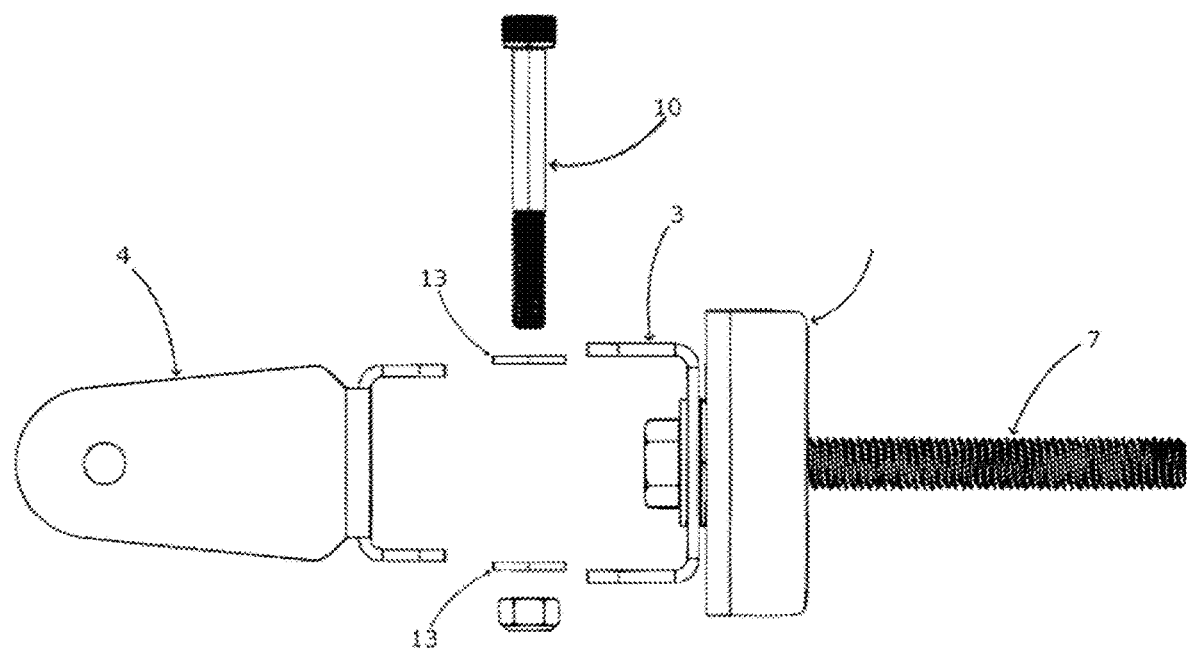

FIG. 26 illustrates a side exploded view of the swivel bracket and pulley bracket fitment, shown with assembly hardware, in accordance with an embodiment of the present invention.

Figure 27:
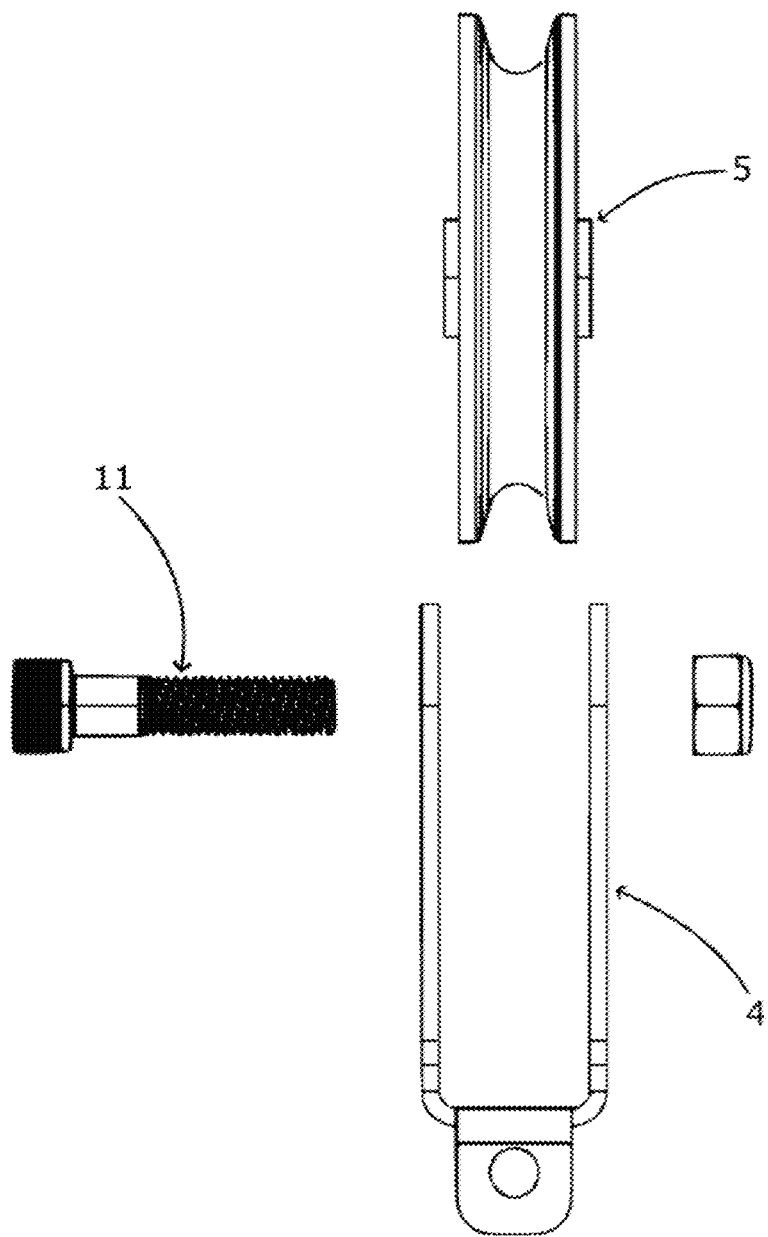
Figure 28:
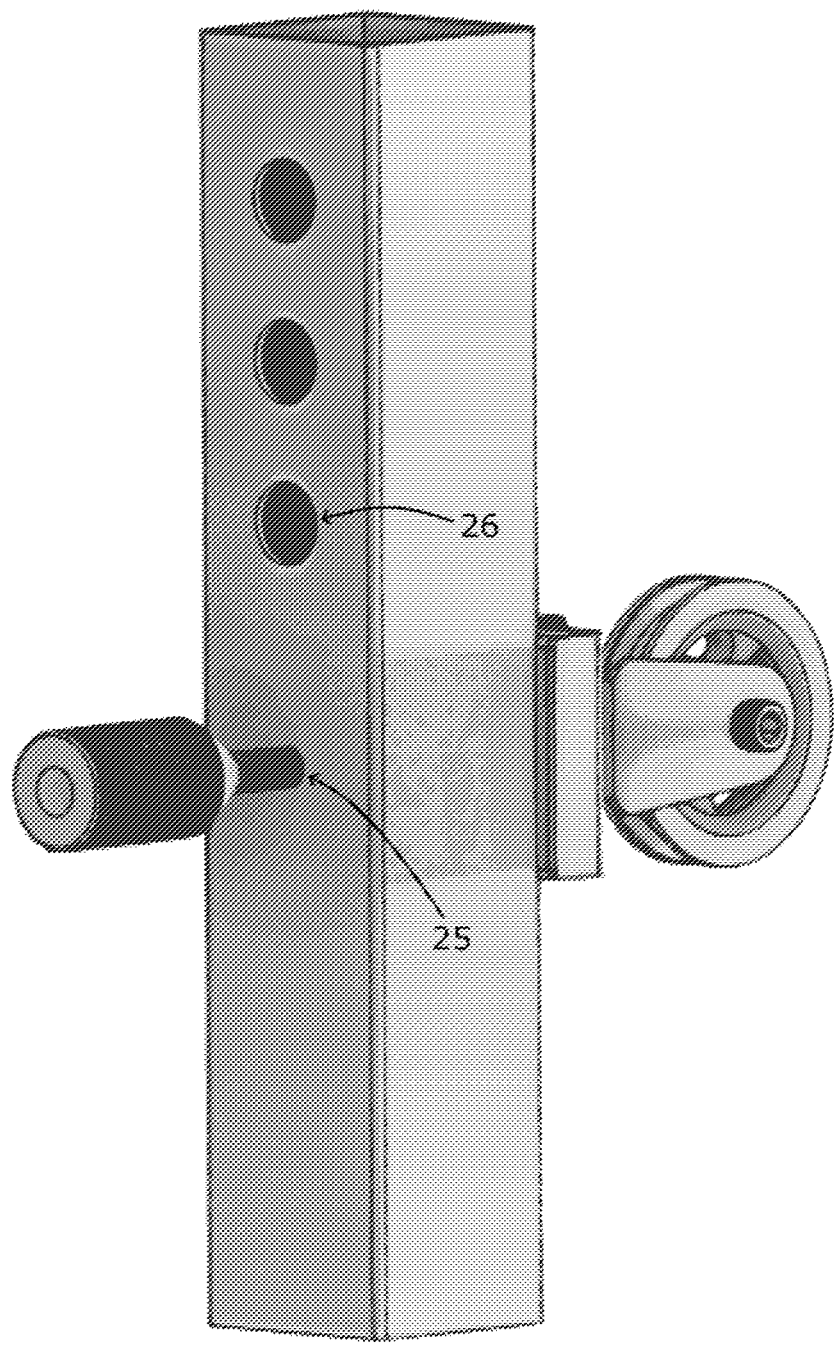

FIG. 27 illustrates a top exploded view of the pulley bracket and pulley fitment, shown with assembly hardware, in accordance with an embodiment of the present invention.

Figure 28:
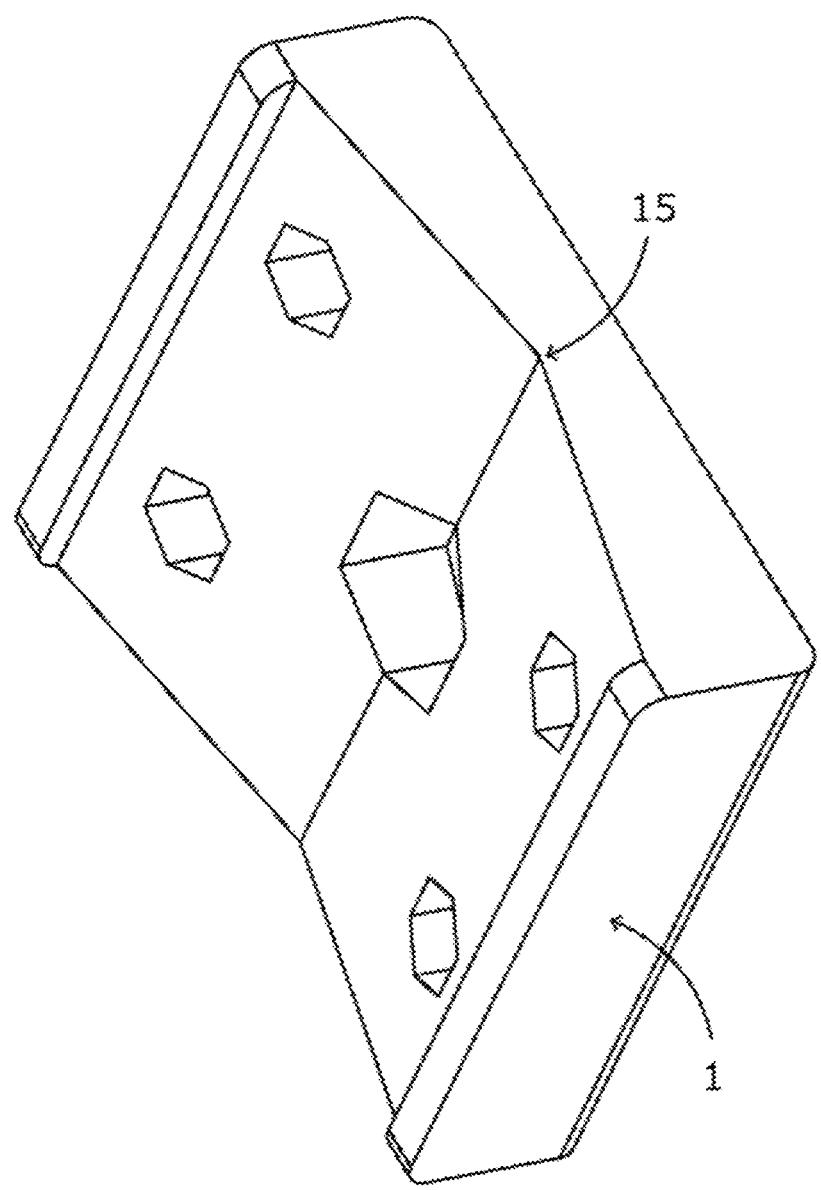

FIG. 28 is an illustrative view of the main assembly being installed in a 0.5" hole on a 3"×3" beam of a weight lifting apparatus such as a power rack, in accordance with an embodiment of the present invention.

Figure 29:
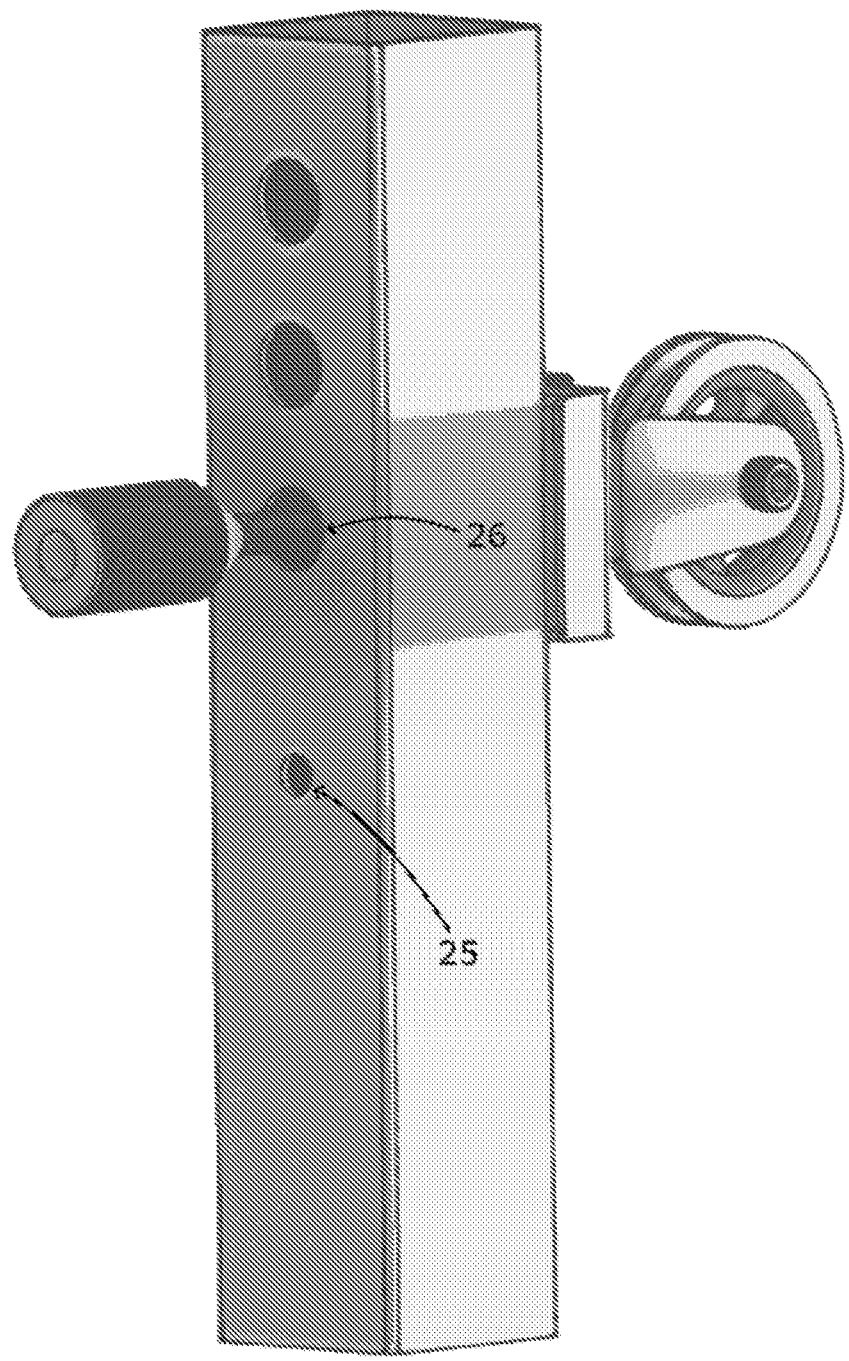

FIG. 29 is an illustrative view of the main assembly being installed in a 1" hole on a 3"×3" beam of a weight lifting apparatus such as a power rack, in accordance with an embodiment of the present invention.

Figure 30:
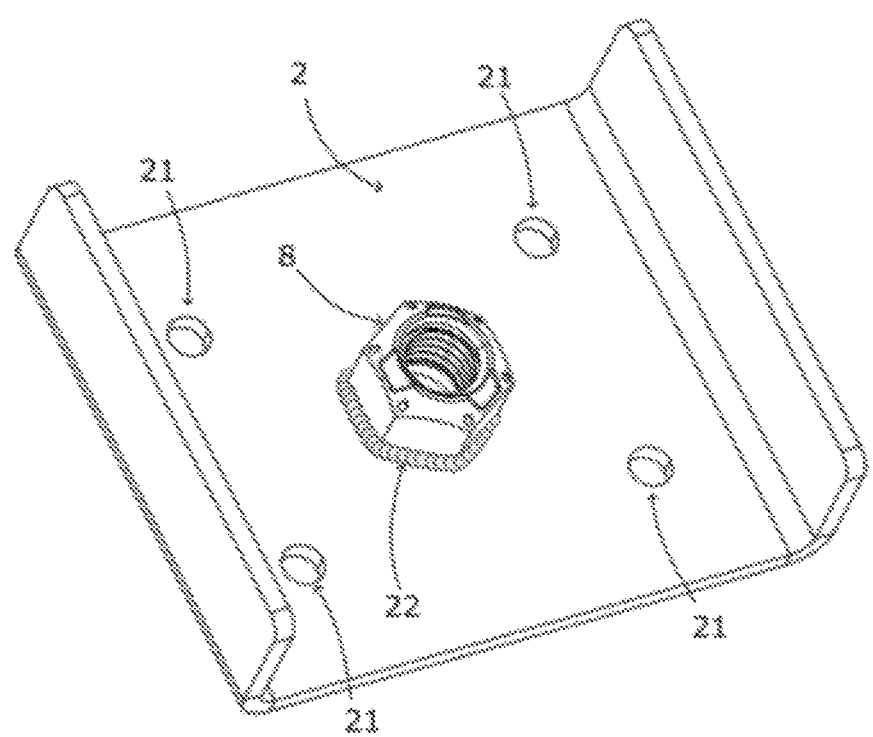

FIG. 30 is a rear side view of the V brace bracket with welded region, in accordance with an embodiment of the present invention.

DETAILED DESCRIPTION OF THE INVENTION

The embodiments herein and the various features and advantageous details thereof are explained more fully with reference to the non-limiting embodiments and detailed in the following description. Descriptions of well-known components and processing techniques are omitted so as not to unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiment herein.

Some embodiments of this disclosure, illustrating all its features, will now be discussed in detail. The words "retaining", "connecting", "charging", "latching", "transmitting", "enabling", "establishing", "attaching" and other forms thereof, are intended to be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "an embodiment" is to be read as "at least one embodiment." The term "another embodiment" is to be read as "at least one other embodiment." Although any system and methods similar or equivalent to those described herein can be used in the practice or testing of embodiments of the present disclosure, the exemplary system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the scope consistent with the principles and features described herein.

'Traditionally, weight lifting apparatus and power racks have been designed with fixed configurations, limiting their adaptability and versatility. Existing devices often lack compatibility with different brands or sizes of equipment, constraining users to specific options based on their existing setup. Recognizing the limitations of existing designs, there is a growing need for innovative solutions that offer greater flexibility and functionality in weight lifting equipment.

There is a need to address this compatibility issue by providing a versatile accessory compatible with a wide range of weight lifting apparatus and power racks.

Figure 2:
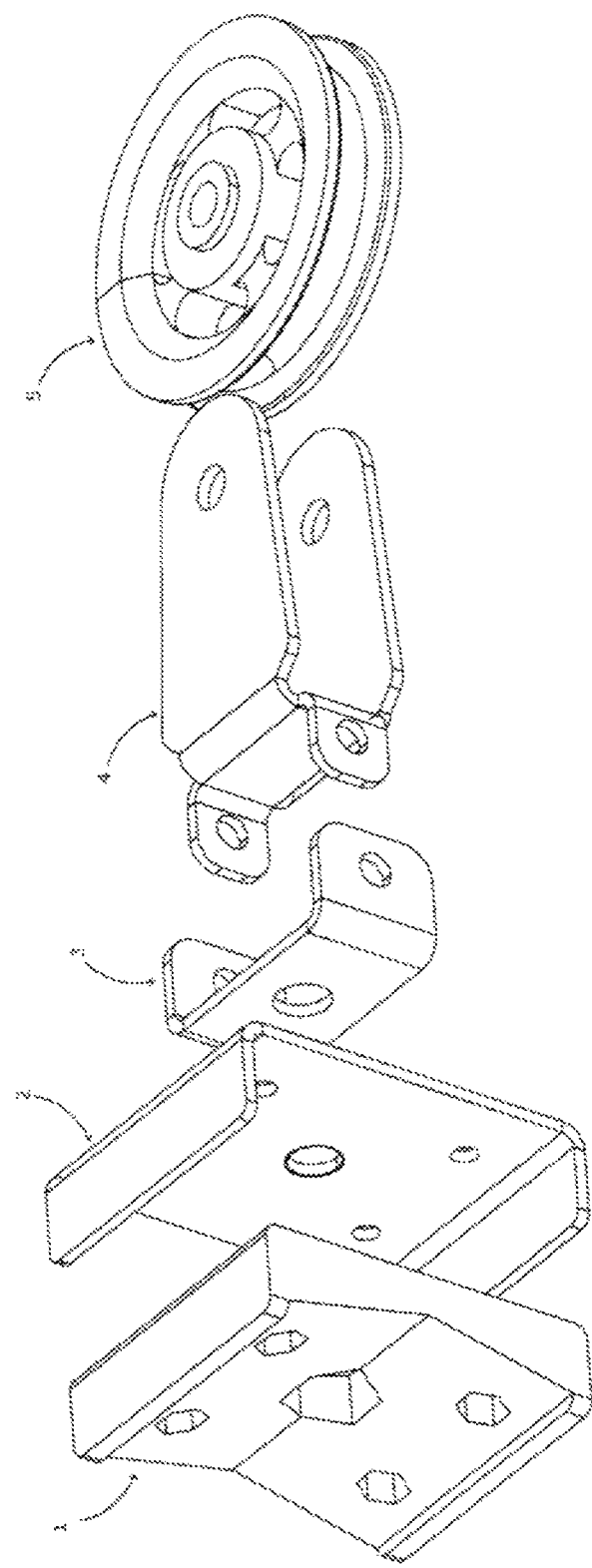

FIGS. 1 and 2 illustrates an exploded perspective view of the components, without assembly hardware, that assemble to form the pulley system. As illustrated in FIGS. 1 and 2, the pulley system 100 comprises a V brace 1, a V brace bracket 2, a swivel bracket 3, a pulley bracket 4, and a pulley 5.

Figure 3:
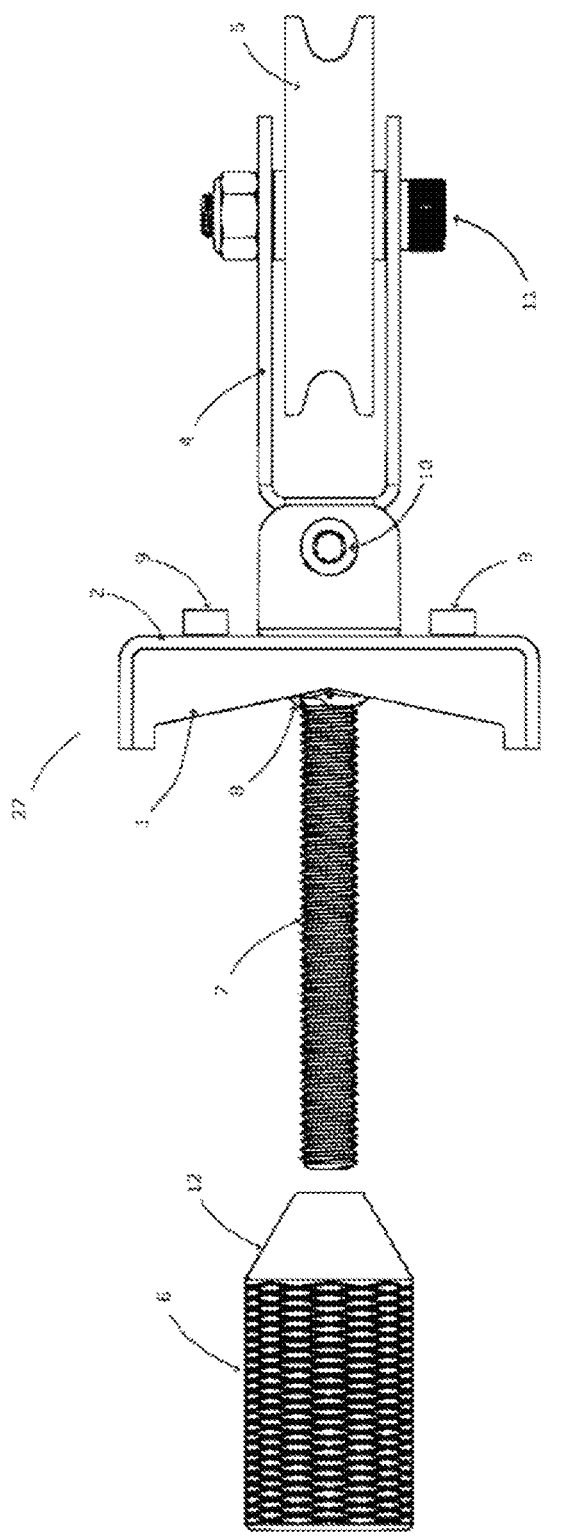

FIG. 3 illustrates the top view of the assembled main assembly and conical tapered nut. As illustrated in FIG. 3, the top view of the assembled main assembly shows V brace 1 is attached to a V brace bracket 2 using a plurality of V brace attachment bolts 23 and V brace attachment nuts 9, and pulley bracket 4 is holding pulley 5 with a second bolt 11 and second locking nut.

Figure 4:
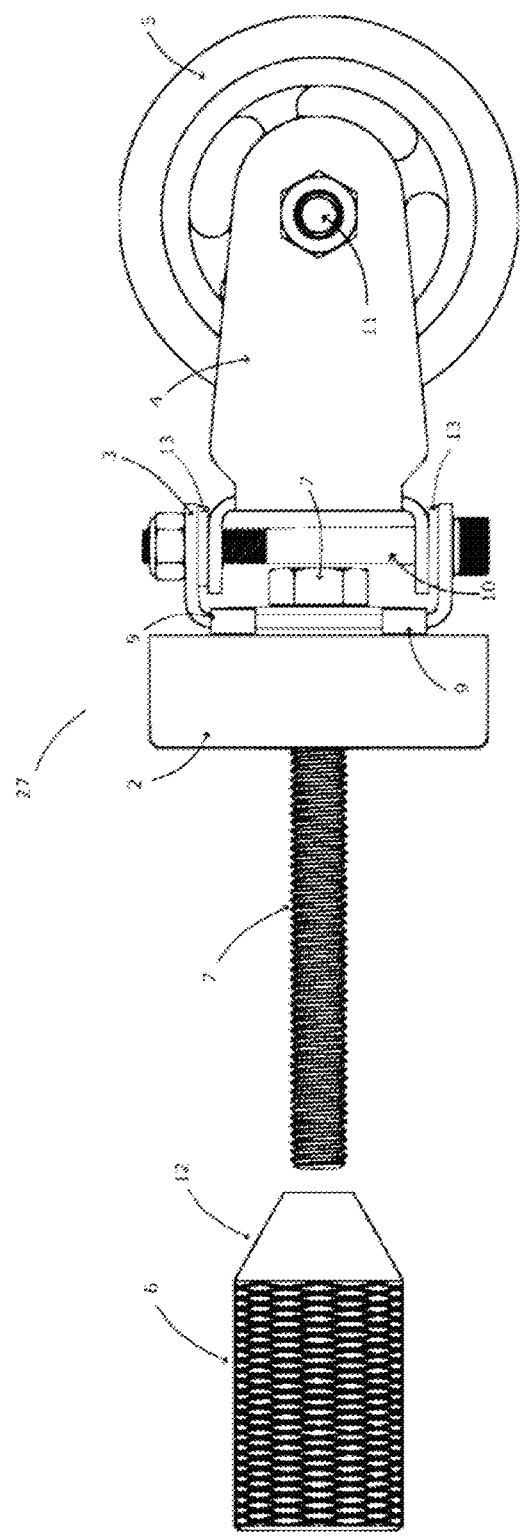
Figure 5:
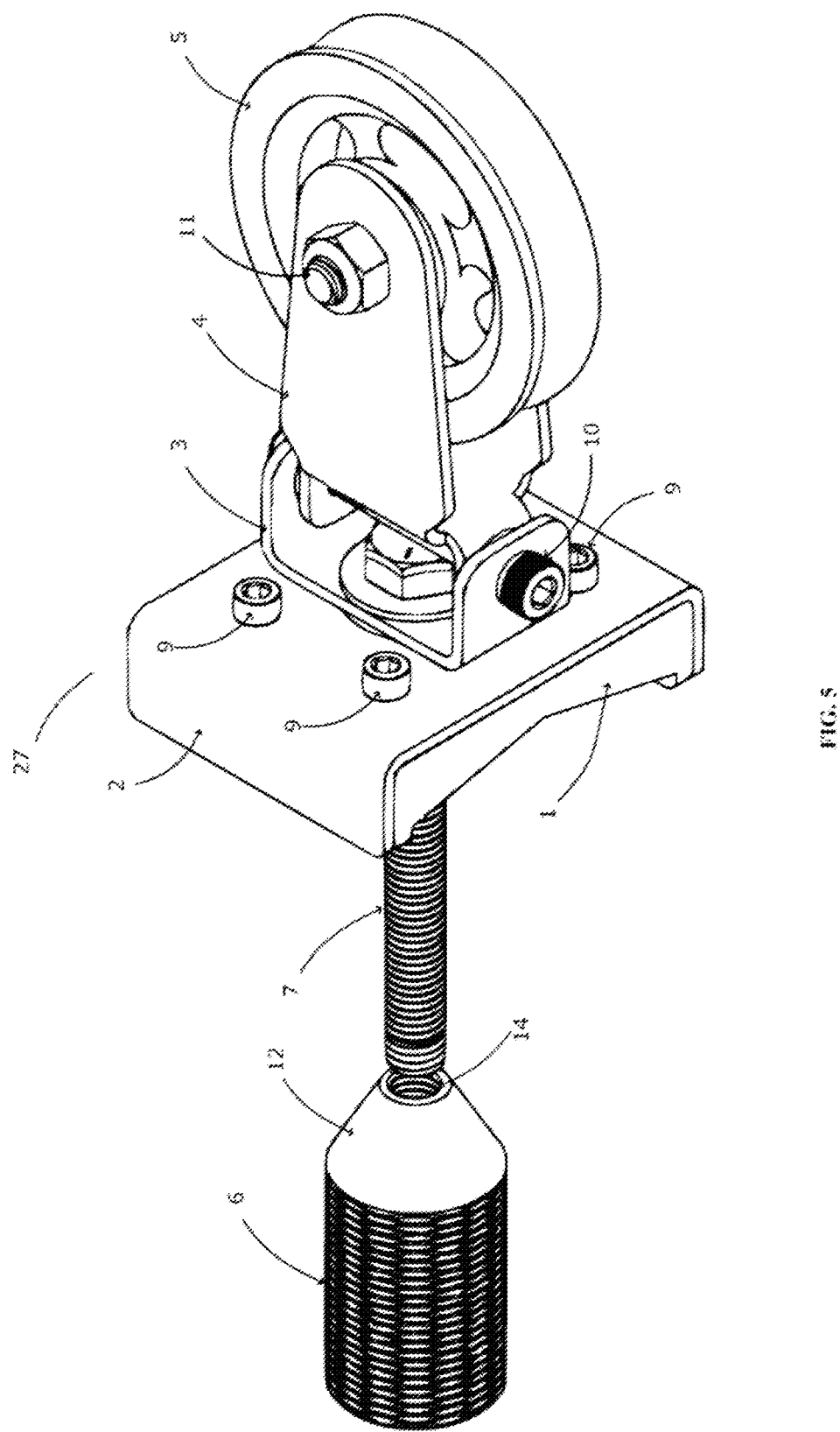

FIG. 4 illustrates a side view of the assembled main body and conical tapered nut. As illustrated in FIG. 4 the side view depicts V brace bracket 2 is further attached to the swivel bracket 3 using a first bolt 7 and first locking nut 8 positioned on the rear side of the V brace bracket 2. FIG. 4 also shows how the pulley bracket 4 which holds pulley 5 with a third bolt 11 and a corresponding third locking nut is connected with the swivel bracket 3 using friction-reducing first washers 13, second bolt 10, and a corresponding second locking nut. Hence the V brace 1, the V brace bracket 2, the swivel bracket 3, the pulley 5, and the pulley bracket 4 along with first washers 13 collectively form a main assembly 27 to be inserted through a hole in a beam 28 of the weight lifting apparatus.

Figure 6:
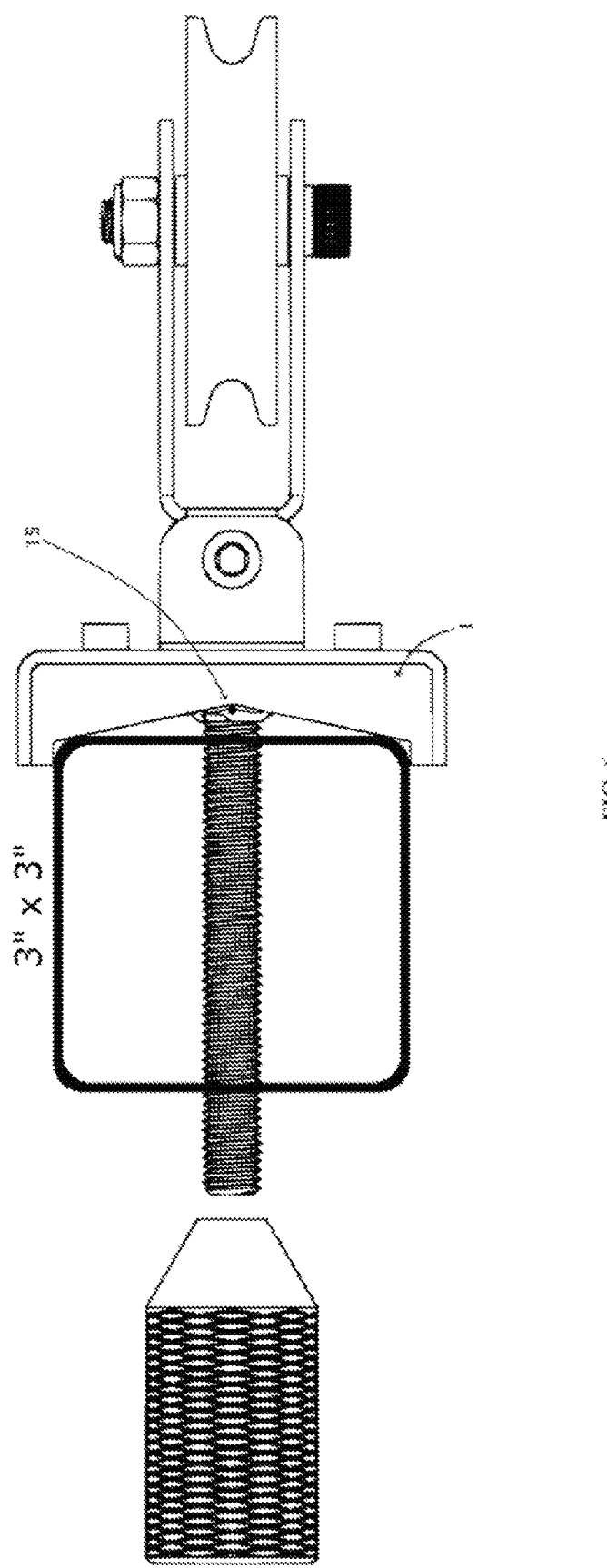
Figure 7:
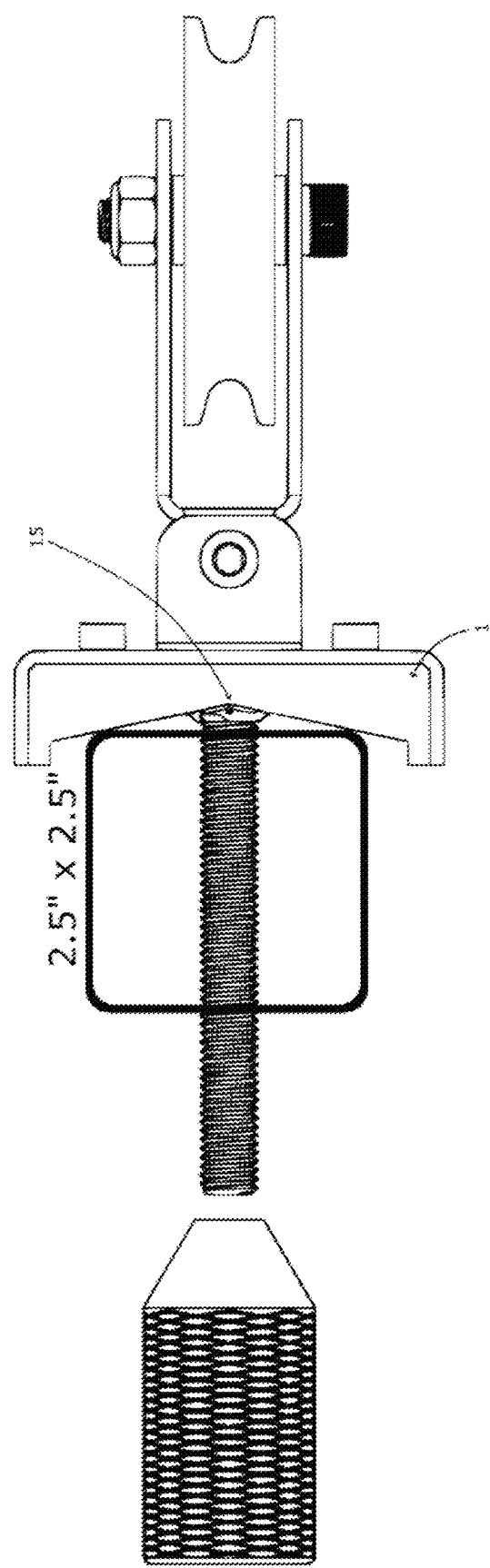

FIGS. 6 and 7 illustrate a top view of the assembled main assembly mounted on a 3"×3" and a 2.5"×2.5" beam 28 of a weight lifting apparatus such as a power rack respectively, of the present subject matter. Hence the pulley system 100 is able to accommodate weight lifting apparatus such as a power rack of multiple shapes and sizes up to 3"×3" in dimension.

In an exemplary embodiment, FIG. 6 shows the main assembly being mounted on a square power rack of 3"×3" and FIG. 7 displays how a square power rack of 2.5"×2.5" being mounted will look like. Alternatively different shaped and sized blocks such as rectangular blocks of 3"×2", 2"×3", 1"×3" etc. up to 3"×3" can be used in place of the square blocks and this is how the pulley system 100 provides universal fit for different types of gym equipment and thereby facilitates and flexible strength training exercises.

FIGS. 8, 9, 10, and 11 illustrate the front, rear, side, and top view of the pulley mounting bracket respectively. The pulley bracket 4 serves as a support structure for holding pulley 5 in place. The pulley bracket 4 has two holes 17 whereby the pulley is held in place on the pulley bracket 4 using bolt 11 and the corresponding nut. This secure attachment ensures that the pulley 5 remains fixed during operation, allowing for smooth and reliable movement of lifting cables on the pulley. Alternatively, the lifting cables in the above arrangement may be replaced with lifting ropes for strength training exercises.

Figure 8:
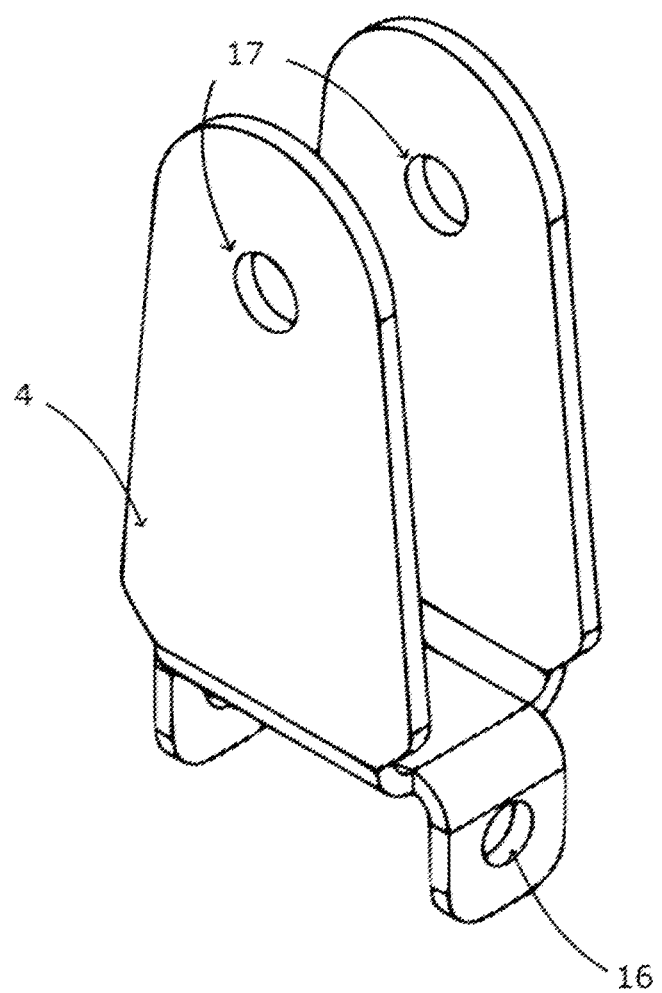
Figure 9:
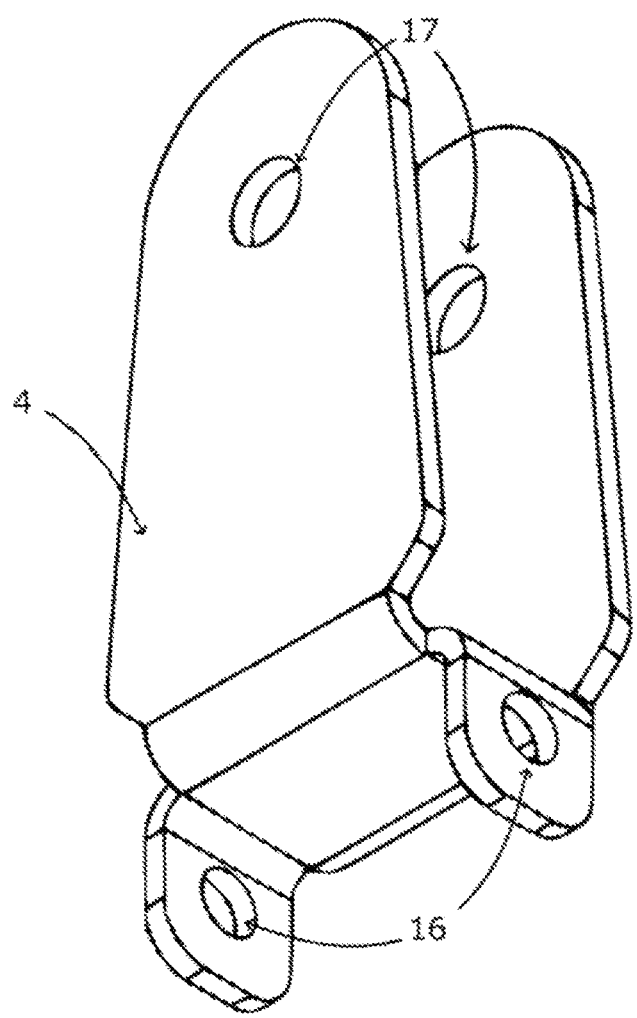
Figure 10:
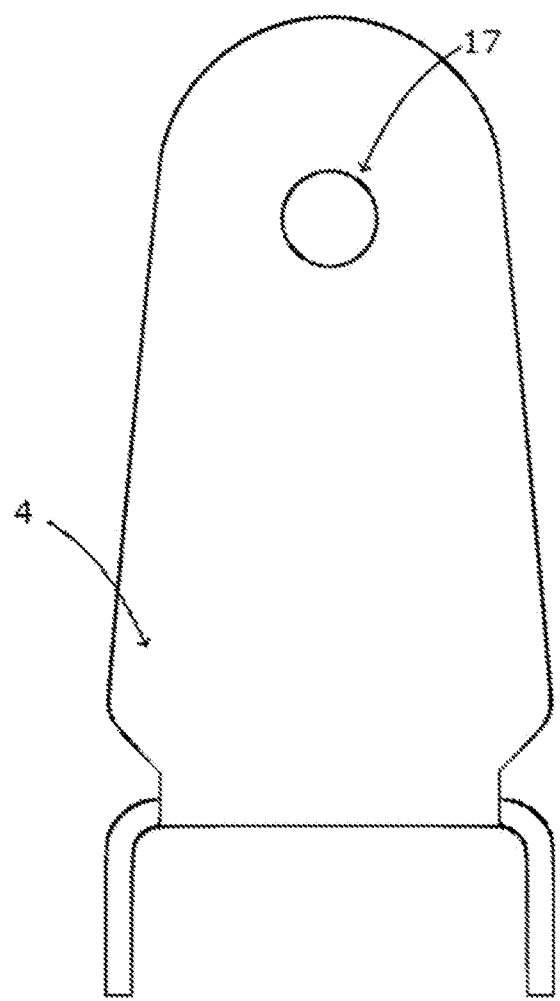
Figure 11:
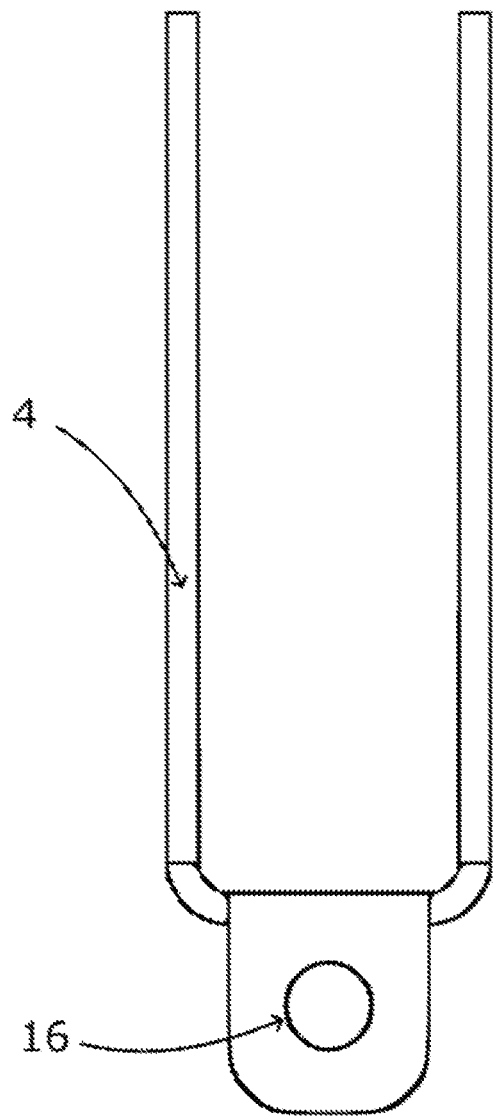

As illustrated in FIGS. 8, 9, and 11, the pulley bracket has two holes 16 whereby bolt 10 along with the corresponding nut, and friction-reducing first washers 13 are inserted to connect the pulley bracket with the swivel bracket. The friction-reducing first washers may be made of polymer material such as nylon. Alternatively, the first washers may be made of rubber or any other suitable material that reduces friction during motion. In terms of functionality, the pulley bracket 4 offers a significant range of motion. It can swivel left or right with a range of 180 degrees, providing versatility for a group of exercises and movement patterns. This wide swiveling capability enables users to engage in different exercises, efficiently targeting various muscle groups.

FIGS. 12, 13, and 14 illustrate the front perspective view, front perspective view, and side view of the swivel bracket. The swivel bracket 3 is a pivotal component of the pulley system 100. The swivel bracket 3 is attached to the V brace bracket 2 using a bolt and locking nut mechanism passing through hole 18, on the rear side, to provide adaptable movements. The swivel bracket 3 is attached to the pulley bracket via holes 19 using bolt 10 and the corresponding nut along with friction-reducing first washers 13. The bolt and locking nut mechanism is arranged in a particular manner to allow bolt 10 to pass through holes 19 of swivel bracket 3 and holes 16 of the pulley bracket 4. This specialized arrangement is planned to facilitate certain degrees of swiveling movement towards the left and right-hand side, enhancing flexibility in exercise positioning.

FIG. 15 illustrates the front view of the assembled main assembly with a representation of the restricted rotation of the swivel bracket. FIG. 15B shows the normal position of the pulley system. FIGS. 15A and 15C show the swivel bracket allowing restricted rotation of 15 degrees to the left and 15 degrees to the right. These figures depict how V brace attachment nuts 9 are restricting the rotation of swivel bracket 3. This novel feature of restricted rotation prevents twisting, turning, and rotation of the pulley 5 other than a predetermined degree of angle either on the left or on the right-hand side, thereby avoiding accidental disengagement and any mishappening during workout sessions.

FIGS. 16, 16A and 17 depict the conical Tapered nut 6 that is used for securely fastening the main assembly 27 to a power rack beam 28. The conical taper 12 is designed to allow effective and secure thread 14 onto bolt 7 that passes through multiple holes 25, and 26 of different sizes, on a weight lifting apparatus or power rack beam 28. This conical tapered design of the conical tapered nut 6 facilitates universal fitting on power rack beams 28 with holes ranging between 0.5 inches to 1.375 inches in diameter, for holes 25 and 26 respectively. This wide range of compatibility makes the device suitable for various weight lifting apparatus or power rack beams 28, providing versatility and convenience for users. The conical tapered nut 6 features a faux knurling pattern engraved on its surface that provides an enhanced grip along with the appearance of a traditional gym barbell. This threaded attachment 14 mechanism ensures a stable and reliable connection between the main assembly 27 and the weight lifting apparatus or power rack beam 28. Hence the knurled surface of the conical tapered nut not only provides aesthetic appeal but also reinforces the association with gym equipment.

FIGS. 19, 20, and 21 illustrate V brace 1 of the main assembly 27. The V brace 1, is attached to the V brace bracket 2 using four V brace attachment bolts 23 and corresponding V brace attachment nuts and so there are four holes in the V brace 1 as shown in FIGS. 19, 20, and 21. The V brace 1 is tapered in shape making a V shape 15 in a manner to prevent twisting left or right during tightening of the rear tapered conical nut 6. The V Brace 1 is designed with a big hole in the center to hold the first bolt 7 and first locking nut 8 along with a V-shaped trough 15 designed in a manner to facilitate a universal fit for power rack beam 28 of any shape up to 3"×3" in dimension.

FIGS. 22 and 23 depict V brace bracket 2 supporting V brace 1. The V brace bracket 2 is a steel bracket that provides support and stabilization for the V brace. Alternatively, the V brace bracket may be made up of any strong and durable material strong enough to hold and support V brace 1. The V brace bracket 2 has four holes 21 to hold four V brace attachment bolts 23 and corresponding V brace attachment nuts along with a big hole in the center that coincides with the center hole of V brace 1 to accommodate the first locking nut 8. The bolts and nuts create a secure connection, ensuring the V brace 1 remains securely attached to the V brace bracket 2. The V brace bracket 2 also holds the swivel bracket 3 in position through a bolt 7 that threads through the first locking nut 8 located on the back side of the V brace bracket 2. The threaded first bolt 7 and first locking nut 8 combination provides a strong and reliable connection, enabling smooth rotation and movement of the swivel bracket 3 while maintaining stability.

FIG. 24 illustrates an exploded perspective view of the V brace 1 and V brace bracket 2 fitments, shown with assembly hardware. This figure depicts how V brace 1 fits into V brace bracket 2 using bolts and a locking nut mechanism. Similarly, FIG. 25 illustrates how swivel bracket 3 fits into the pulley bracket 4 with the help of second bolt 10 and second nut.

As illustrated in FIG. 26, the swivel bracket 3 is attached to the pulley bracket 4 using bolt 10, the corresponding nut along with the friction-reducing first washers 13. FIG. 27 shows an exploded view of the pulley bracket and pulley fitment wherein, pulley bracket 4 holds pulley 5 using bolt 11 and the corresponding nut, showing how the pulley system 100 is able to attach pulley 5 and pulley bracket 4.

FIGS. 28 and 29 illustrate the main assembly being installed in a 0.5" hole and 1" hole on a 3"×3" beam 28 of a weight lifting apparatus. These figures show exemplary embodiments wherein the pulley system 100 may be used with beam 28 of varying-sized holes and thus provides a universal fit for different gym equipment.

FIG. 30 illustrates an exemplary embodiment wherein a different method is used to fix nut 8 onto the rear side of the V brace bracket 2. Nut 8 is attached to the V brace bracket 2 using welding and the welded region 22 around nut 8 is shown clearly in FIG. 30.

In another implementation, a method for installing a pulley system 100 onto a weight lifting apparatus is disclosed. The order in which method 200 is described is not intended to be construed as a limitation, and any number of the described method blocks can be combined in any order to implement method 200 or alternate methods for installing a pulley system 100 onto a weight lifting apparatus. Additionally, individual blocks may be deleted from method 200 without departing from the scope of the subject matter described herein. Furthermore, method 200 for installing a pulley system 100 onto a weight lifting apparatus is disclosed and can be implemented in any suitable gym equipment, accessories, spare parts, or combination thereof. However, for ease of explanation, in the embodiments described below, method 200 may be implemented in the above-described system 102.

At step 202 the swivel bracket 3 is attached to the V brace bracket 2 using first bolt 7 and first locking nut 8 is positioned on the rear side of the V brace bracket 2.

At step 204 the V brace 1 is secured to the V brace bracket 2 with a plurality of V brace attachment bolts 23 and V brace attachment nuts 9.

At step 206 the pulley bracket 4 is attached to the swivel bracket 3 using friction-reducing first washers 13, a second bolt 10, and a second locking nut.

At step 208 the pulley 5 is mounted onto the pulley bracket 4 with third bolt 11 and third nut.

At step 210 the main assembly 27 comprising the aforementioned components is inserted through a hole in the beam 28 of the weight lifting apparatus.

Finally, at step 212 the main assembly 27 is secured to the beam 28 of the weight lifting apparatus using a conical tapered nut 6 allowing securely thread 14 onto first bolt 7 that passes through multiple different sized holes 25, 26 on a weight lifting apparatus.

The main advantage of the present subject matter is adaptability to various weight lifting apparatus and power racks thus facilitating users to perform a wide range of exercises with ease and flexibility. By utilizing the aforementioned components in combination with specialized fasteners and attachment mechanisms, the pulley system qualifies to be securely mounted to square or rectangular beams of varying dimensions, ensuring stability and reliability during exercise sessions.

Another advantage of the present subject matter is the ability to be used an upper pulley by loosening the center bolt, rotating the pulley assembly by 90 degrees, and tightening the pulley again.

Another advantage of the present subject matter is the ability to adjust the pulley height, angle, and position thus catering to the diverse needs and preferences of users.

Yet another advantage of the present subject matter is the ability to provide a universal solution for strength training exercises, offering adaptability, versatility, and functionality across different fitness environments and equipment setups. This technical superiority not only enhances user experience and satisfaction but also underscores the innovation and ingenuity behind the patented design.

Another advantage of the present subject matter is the quick-release mechanism to install or replace the lifting cable as and when required, unlike other complex pieces of equipment that demand huge labor and expertise for installation. With straightforward assembly instructions and very few hardware requirements, users can quickly integrate the pulley system into their workout space without needing professional assistance.

Yet another advantage of the present subject matter is cost-effectiveness. While specialized pulley systems may require separate purchases for different equipment brands or sizes, the pulley system offers cost-effectiveness by eliminating the need for multiple systems. Users can invest in a single pulley system that can be used with various equipment, saving both money and space.

Yet another advantage of the present subject matter is safe and controlled operations. The system's components, including the pulley, pulley bracket, and swivel bracket, are designed to ensure controlled and seamless movement during exercise sessions. Friction-reducing polymer first washers and secure locking mechanisms contribute to smooth movement and stability, allowing users to focus on their workout without interruptions. Further, the pulley system prioritizes user safety with its secure attachment mechanisms and durable construction during strength training exercises.

These technical advantages may generate a pool of application areas for the present subject matter with the list including Fitness Equipment Manufacturers, Gym Equipment Suppliers, Personal Trainers and Fitness Centers, Home Gym Enthusiasts, and Rehabilitation Facilities.

The preceding description of the specific embodiments will so fully reveal the general nature of the embodiments herein that others can, by applying current knowledge, readily configure and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for description and not for limitation. Therefore, while the embodiments herein have been described in terms of preferred embodiments, those skilled in the art will recognize that the embodiments herein can be practiced with modification within the spirit and scope of the embodiments as described herein.

| | Reference Numerals: |
|---|---|
| 100 | pulley system |
| 1 | V brace |
| 2 | V brace bracket |
| 3 | Swivel bracket |
| 4 | Pulley bracket |
| 5 | Pulley |
| 6 | Conical tapered nut |
| 7 | Threaded bolt |
| 8 | First locking nut |
| 9 | Plurality of V brace attachment nuts |
| 10 | Second locking bolt |
| 11 | Third locking bolt |
| 12 | Conical taper design |
| 13 | First washers |
| 14 | Threaded attachment mechanism for conical tapered nut |
| 15 | V-shaped trough |
| 16 | Holes on the lower body of the pulley bracket |
| 17 | Holes on the upper body of the pulley bracket |
| 18 | Center hole on swivel bracket |
| 19 | Holes on sides of the swivel bracket |
| 20 | Unthreaded portion of the conical nut |
| 21 | Plurality of holes on V brace bracket |
| 22 | Welding region around nut 8 |
| 23 | Plurality of V brace attachment bolts |
| 24 | Second washers |
| 25 | Holes on power rack beam of 0.5' |
| 26 | Holes on power rack beam of 1' |
| 27 | Main assembly |
| 28 | Power rack beam |
| 29 | Square power rack of 2.5" × 2.5" |
| 200 | A method for installing a pulley system onto a weight lifting apparatus |

The invention claimed is:

1. A pulley system for a weight lifting apparatus, comprising:
a swivel bracket attached to a V brace bracket using a first bolt and a first locking nut positioned on a rear side of the V brace bracket;
a V brace attached to the V brace bracket using a plurality of V brace attachment bolts and V brace attachment nuts;
a pulley bracket attached to the swivel bracket using a plurality of friction-reducing first washers, a second bolt, and a second locking nut; and
a pulley attached to the pulley bracket with a third bolt and a third locking nut;
wherein the V brace, the V brace bracket, the swivel bracket, the pulley, and the pulley bracket along with the plurality of friction-reducing first washers collectively form a main assembly, wherein the main assembly is configured to be secured to a beam by inserting the first bolt through a hole in the beam, wherein the main assembly is fastened to the beam using a conical tapered nut, thereby facilitating fit on the weight lifting apparatus, and wherein the V brace is configured to rotate up to 90 degrees when the first bolt is loosened.

2. The pulley system of claim 1, wherein the conical tapered nut is designed with a conical taper, allowing for a thread attachment mechanism onto the first bolt that passes through multiple different sized holes in the beam of the weight lifting apparatus.

3. The pulley system of claim 1, wherein the plurality of V brace attachment bolts and the V brace attachment nuts connecting the V brace to the V brace bracket are designed in a manner to provide restricted rotation of the swivel bracket.

4. The pulley system of claim 1, wherein the V brace is tapered to resist twisting forces and provide stability during a workout.

5. The pulley system of claim 1, wherein the pulley bracket is adjustable along the swivel bracket to accommodate different angles of pull.

6. The pulley system of claim 1, further comprises a lifting cable guide mechanism attached to the main assembly for controlled movement of a lifting cable.

7. The pulley system of claim 1, wherein the conical tapered nut includes a locking mechanism to prevent loosening during a workout.

8. The pulley system of claim 1, wherein the main assembly supports handles, bars, lifting cables, and ropes for different workout options.

9. The pulley system of claim 1, wherein the pulley is a wheel with an inner bearing and a grooved rim whereby the lifting cable is to be threaded, and wherein the pulley is detachable from the pulley bracket to enable quick installation and replacement of the lifting cable.

10. The pulley system of claim 1, wherein the first washers are friction-reducing washers made up of polymer-type material, and atleast a second washer is made up of metal.

11. A method for installing a pulley system onto a weight lifting apparatus, the method comprises:
attaching, a swivel bracket to a V brace bracket using a first bolt and a first locking nut positioned on a rear side of the V brace bracket;
securing, a V brace to the V brace bracket with a plurality of V brace attachment bolts and corresponding V brace attachment nuts;
attaching, a pulley bracket to the swivel bracket with a plurality of first washers, a second bolt, and a second locking nut;
mounting, a pulley onto the pulley bracket with a third bolt and a third locking nut;
inserting, a main assembly comprising the swivel bracket, V brace bracket, V brace, pulley bracket, pulley, and first washers, wherein the main assembly is configured to be secured to a beam by inserting the first bolt through a hole in the beam of the weight lifting apparatus; and
connecting, the main assembly to the beam of the weight lifting apparatus using a conical tapered nut allowing to secure a thread onto the first bolt that passes through multiple different-sized holes on the weight lifting apparatus, wherein the V brace is configured to rotate up to 90 degrees when the first bolt is loosened.

12. The method of claim 11, wherein the plurality of V brace attachment bolts and the V brace attachment nuts connecting the V brace to the V brace bracket are designed in a manner to provide restricted rotation of the swivel bracket.

13. The method of claim 11, further comprises adjusting the position of the pulley bracket along the swivel bracket to accommodate different angles of pull.

14. The method of claim 11, further comprises attaching a lifting cable guide mechanism to the main assembly for controlled movement of the lifting cable.

15. The method of claim 11, further comprises selecting the V brace bracket and the V brace with dimensions compatible with a plurality of weight lifting apparatus.

* * * * *